United States Patent [19]

Paschke et al.

[11] Patent Number: 5,340,776
[45] Date of Patent: Aug. 23, 1994

[54] PREPARATION OF VERY FINE GLASS POWDER OF HIGH PURITY

[75] Inventors: Hartmut Paschke, Ergolding; Johann Daimer, Oberahrein; Richard Häring, Landshut, all of Fed. Rep. of Germany

[73] Assignee: Schott Glaswerke, Mainz, Fed. Rep. of Germany

[21] Appl. No.: 881,929

[22] Filed: May 12, 1992

Related U.S. Application Data

[63] Continuation-in-part of Ser. No. 819,237, Jan. 13, 1992, abandoned.

[30] Foreign Application Priority Data

Jan. 11, 1991 [DE] Fed. Rep. of Germany ....... 4100604

[51] Int. Cl.$^5$ ................................................ C03C 3/00
[52] U.S. Cl. ................................................ 501/11
[58] Field of Search ................ 501/11; 241/15, 17, 241/26, 21; 65/61; 264/28

[56] References Cited

U.S. PATENT DOCUMENTS

| | | | |
|---|---|---|---|
| 3,126,293 | 3/1964 | McSheehy et al. | 241/15 |
| 3,358,938 | 12/1967 | Browal | 241/21 |
| 3,423,032 | 1/1969 | Eckert | 241/15 |
| 3,881,661 | 5/1975 | Powers et al. | 241/15 |
| 4,056,230 | 11/1977 | Decobart | 241/15 |
| 4,202,815 | 5/1980 | Wegmann | 260/42.21 |
| 5,047,182 | 9/1991 | Sundback et al. | 264/28 |

OTHER PUBLICATIONS

James S. Reed, Introduction to the Principles of Ceramic Processing, Wiley & Sons 1988 (no month) pp. 53, 126–127, 255–258, 268–271, 274, 423.

*Primary Examiner*—Mark L. Bell
*Assistant Examiner*—A. Wright
*Attorney, Agent, or Firm*—Millen, White, Zelano & Branigan

[57] ABSTRACT

For the preparation of high purity glass powder having a mean particle size of $\leq 10$ μm, glass powder having a larger particle size up to 300 μm is ground to the desired particle size in a stirred mill with glass grinding elements in the presence of a grinding liquid comprising water or preferably a mixture of at least 50% by weight of water and at least one water-soluble, oxygen-containing organic compound having 1 to 5 carbon atoms in the molecule, e.g., tert.-butyl alcohol; the ground slurry is then frozen, and the solvent is subsequently removed from the frozen slurry by freeze-drying. A resultant glass powder with a mean particle size $d_{50}$ of 0.5 to 2 μm is particularly suitable as a filler for synthetic resins in the dental sector.

25 Claims, No Drawings

PREPARATION OF VERY FINE GLASS POWDER OF HIGH PURITY

CROSS-REFERENCE TO RELATED APPLICATION

This application is a continuation-in-part of application Ser. No. 07/819,237, filed Jan. 13, 1992.

BACKGROUND OF THE INVENTION

This invention relates to the preparation of very fine glass powder of high purity having a mean particle size $d_{50}$ of $\leq 10$ μm by wet-grinding in the presence of grinding elements.

High-purity glass powders are required, in particular, as fillers for plastics employed in the dental sector, for example, dental fillings. For glass powders of this type, mean particle diameters $d_{50}$ of at most 10 μm, preferably <5 μm, in particular $\leq 3$ μm are required since the mechanical properties such as polishability and abrasion resistance, are improved with increasing fineness (decreasing particle diameter). Excessively large glass particles (<10 μm) produce a rough surface in the cured plastic or break out and leave holes and sharp edges. The refractive index of the glass powder must agree very closely with that of the plastic in order to achieve high transparency and translucency of the filled plastic. If the glass powder contains, for example, coloring particles or particles having different refractive indices, the translucency and transparency and possibly also the color of the filled plastic are impaired, so that the plastic can frequently only be used with considerable restrictions, if at all.

Glass powders are prepared by grinding. The grinding processes hitherto have the disadvantages of, in some cases, high energy consumption for the grinding, long grinding times for fine particle sizes and high abrasion of grinding pebbles and the mill wall. The abrasion particles impair the transparency and translucency of the filled plastic and make the production of very pale tooth colors difficult.

The conventional dry-grinding processes are at the limit of their performance for these small particle sizes, require long grinding times and generally require an additional air separator for classifying the grinding material. Abrasion of the grinding elements, wear of the grinding container or of the air separator and the energy consumption are so high that these grinding processes are unsuitable for the preparation of very fine glass powders.

Although wet-grinding processes using water yield fine particle sizes in a shorter time than do dry-grinding processes, the grinding elements are still subject to considerable abrasion and a particular disadvantage is that numerous agglomerates, i.e., very solid clusters of powder particles, which act in a similar way to large individual particles and dramatically impair the properties of the filled plastic, form from the grinding slurry on drying. If, by contrast, the grinding is carried out in the presence of organic liquids in which agglomeration is substantially suppressed on drying (for example, low-boiling hydrocarbons), the grinding times are considerably extended, the amount of grinding abrasion increases correspondingly and additional safety precautions for example, explosion protection, become necessary.

SUMMARY OF THE INVENTION

An object of the invention is to provide an improved process for the preparation of very fine glass powder of high purity, especially a process wherein powders having a mean particle size $d_{50}$ of from 0.2 to 10 μm, preferably from 0.5 to 5 μm, in particular from 0.5 to 2 μm, can be produced.

Another object is to provide resultant glass powders having a purity which permits their introduction into filled plastics for providing very pale tooth colors in the dental sector.

Upon further study of the specification and appended claims, further objects and advantages of this invention will become apparent to those skilled in the art.

To achieve these objects, there is provided a process having several novel concepts, each novel concept contributing to the success of the process. In combination there is provided a comprehensive process for the preparation of very fine glass powder of high purity having a desired mean particle size $d_{50}$ of $\leq 10$ μm by wet-grinding in the presence of grinding elements, comprising grinding a glass powder having a higher mean particle size than 10 μm and a maximum particle size of $\leq 300$ μm to said desired particle size in a stirred mill with glass grinding elements, in the presence of a grinding liquid comprising water or a mixture of at least 50% by weight of water and at least one water-soluble, oxygen-containing organic compound having 1 to 5 carbon atoms in the molecule; freezing the ground slurry; and freeze-drying the frozen ground slurry to remove the grinding liquid.

The process is preferably carried out using an attrition or stirred mill (Attritor mill; see Perry's Handbook of Chemical Engineering, Sixth Edition, McGraw-Hill, New York, 1984, pp. 8–35), since a mill of this type allows glass powders having the desired fineness to be prepared particularly simply. In order to achieve short grinding times, it is furthermore generally necessary to carry out the grinding in the presence of a grinding liquid comprising water or preferably mixtures of at least 50% by weight of water and at least one water-soluble, oxygen-containing organic compound having 1 to 5 carbon atoms in the molecule. Mixtures of water with organic compounds are preferred since attack of water on the glass powder is less pronounced. More preferably, the content of the organic compounds in the aqueous mixtures is 1–20%, especially 1–5%, of the organic compound. Suitable organic compounds include, but are not limited to, aldehydes, e.g., formaldehyde, acetaldehyde, propionaldehyde, butyraldehyde and pentanal; ketones, e.g., acetone, methyl ethyl ketone and diethyl ketone; ester, for example, ethyl acetate, methyl acetate, propyl acetate, methyl formate, ethyl formate and propyl formate; or acids, e.g., acetic acid and propionic acid. Monohydric, dihydric and trihydric alcohols are also suitable. An example of a suitable trihydric alcohol is glycerol which, however, requires longer evaporation times; examples of suitable dihydric alcohols are ethylene glycol and the propane diols. Monohydric alcohols, in particular those having up to five carbon atoms in the molecule, are particularly suitable. Of the eight isomeric pentanols, most can only be used mixed with lower alcohols since their water solubility, up to that of 2-pentanol, is inadequate. Their use is also associated with disadvantages due to, in some cases, an unpleasant odor. Of the 4 isomers of butanol, some are likewise only moderately soluble in water, so that they can again only be used mixed with other alcohols. However, tert.-butyl alcohol is highly suitable, both due to its good water solubility and also due to its high melting point.

Of the organic compounds, those are preferred having a boiling point not above 100° C.; since, otherwise, the removal thereof from the frozen grinding slurry during drying takes too long. Particular preference is given to acetone, tert.-butyl alcohol, methanol, ethanol and n-and i-propanol. Particularly good grinding results are achieved using mixtures of organic compounds, especially the particularly preferred compounds with from 80 to 99% by weight of water. The proportion of water in the mixture should preferably be selected so that the mixture has a freezing point of above −40° C. since the operating costs for freezing equipment which operates at lower temperatures is disproportionately high.

It has furthermore proved advantageous for the grinding operation to be carried out within a pH range of from 1 to 12. Acid or alkaline attack on the glass can take place outside these limits. It is particularly advantageous to work either in the acidic range, i.e., at a pH of from 1 to 6, in particular from 3 to 6, or in the alkaline range, i.e., at a pH of from 8 to 12, in particular 8 to 11. At these pH values, the viscosity of the grinding slurry drops to lower values. A lower viscosity of the slurry is advantageous since the proportional amount of energy directly attributable to the comminution of the glass increases with respect to the overall grinding energy expended and, conversely, the amount used for "stirring" the slurry decreases, so that the energy efficiency of the grinding performance increases. The pH can be adjusted using any desired acids and bases so long as they react with the glass only slightly, if at all. However, preference is given to acid and bases which can also easily be removed from the grinding slurry, i.e., readily volatile acids and bases, e.g., acetic acid, HCl, $HNO_3$, $NH_3$, methylamine, dimethylamine, ethylamine, diethylamine, etc. Preference is given to HCl, $HNO_3$, $NH_3$ and ethylamine.

In order to avoid impairing the properties of the resultant glass powder with respect to color, transparency and translucency in the processed state, there are employed grinding elements made of a glass having abrasion characteristics such that only an insignificant impairment occurs, if any at all, in the properties of the resultant glass powder. Optical and mechanical properties, such as refractive index, color, hardness, resistance to hydrolysis, polishability, etc., of the glass employed for the grinding elements should be similar or preferably identical to the corresponding properties of the glass to be ground. It is preferred for the grinding elements and the glass to be ground to have the same composition.

For grinding in the stirred mill (Attritor mill), the material to be ground must be precomminuted to a maximum particle size of $\leq 300$ μm, preferably $\leq 200$ μm. This precomminution can expediently be effected by dry-grinding of the glass in a ball mill, in which particles of the maximum sizes can be produced rapidly and without measurable abrasion of the grinding container and the grinding balls.

The fine grinding of the precomminuted glass powder to the desired size of the stirred mill is effected using grinding elements having a size of from 0.3 to 10 nun. If the grinding elements are larger than 10 mm, the resultant grinding times are very long and the wear of the grinding elements and of the mill furthermore increases considerably. During grinding in the stirred mill, the glass to be ground is pumped through the mill as a slurry (suspension), and the grinding elements are retained by various conventional measures, for example, a filter cartridge or a friction gap of appropriate dimensions. If the grinding elements are smaller than 0.3 mm, there is a danger of them no longer being adequately retained and damaging the retention systems.

The number of grinding elements affects the grinding action and thus the grinding time necessary in order to prepare a powder having a certain particle size. At a constant weight ratio of grinding element to grinding material, the number of grinding elements, and thus the number of contact points between which the glass particles are ground, increases with decreasing size, and the grinding time decreases. Grinding elements having a size of from 0.5 to 2 mm are therefore preferred. The grinding elements may be in the form of balls, cylindrical elements or glass fragments. The cylindrical shape of the grinding elements is preferred since this shape allows an optimum grinding result to be achieved. These grinding elements can be obtained from sections of a suitable glass rod or by sintering preforms which are dry-pressed or extruded from glass powders. The size is taken to mean the diameter in the case of spherical grinding elements. As for the particle size in the case of glass fragments, the length, width and height of cubic and similar elements and the diameter and length of cylindrical elements should be within said particle size ranges. In any case, it is preferred for the elements to be as compact as possible, i.e., for the individual dimensions to be substantially identical.

In stirred mills, the grinding container, the stirrer and other abrasion-endangered parts are generally lined with or comprise metal, in particular hard metal, or abrasion proof ceramic, for example, $Al_2O_3$, or porcelain. However, the abrasion of the glass powder resulting from ceramic impairs the translucency and transparency of the filled resin compositions based on these powders, and abrasion resulting from metal can even result in a grey coloration. It is therefore preferred to produce these mill parts from the glass to be ground or from a glass which has similar properties, or in the alternative, to coat them with a glass of this type or with an abrasion-resistant, solvent-resistant plastic. The mechanical durability of the plastic coating can be improved by reinforcement with glass powders or glass fibers preferably made of the glass to be ground or a similar glass. Suitable plastics from the group comprise the polyurethanes, aramids or chlorofluorocarbon resins are known per se for lining mills.

When the glass powder has been ground to the desired fineness, the glass slurry is frozen and freeze-dried. During the freeze-drying, the frozen solvent is evaporated in a high vacuum by sublimation. The freeze-drying is well known per se, and freeze-drying units are commercially available from numerous manufacturers; however, the step of freeze-drying in the production of glass powders is believed to be an entirely new concept which is a factor leading to the success of the present invention. Since the cost of freeze-drying units increase considerably with operating temperatures of below −40° C., it is preferred to use solvents or solvent mixtures which freeze at temperatures not lower than −40° C. After the freeze-drying, the glass powder is in finely divided form without agglomeration and is generally ready to use per se.

However, residues from plastic abrasion of the mill lining or from the solvents used may be present in the glass powder, in some cases, strongly adsorbed by the glass surface and, in some cases, resulting in the glass powder which is unusable for very pale tooth colors. In such cases, and also in general, if particularly pure glass powders are to be produced, the glass powder is heated, after the freeze-drying at a sufficiently high temperature and for a sufficiently long time in an oxidizing atmosphere to remove any gray color and brighten the glass, e.g., for from 1 hour to 10 days normally in air, at temperatures between 250° C. and the glass transition temperature $T_g$ of the glass powder, during which treatment the organic constituents are oxidized. The precise heating time depends on the temperature to which the glass powder is heated and on the tenacity with which the organic constituents are adsorbed by the glass powder, and should expediently be matched to the particular grinding conditions. Good results are generally obtained using treatment times of from 12 to 48 hours at from 400 to 600° C.

The process permits the production of very pure glass powders having mean particle sizes $d_{50}$ of from 0.2 to 10 $\mu$m, without difficulty. The particle sizes are determined, for example, using laser diffraction or sedimentation methods (DIN 66 111). Glass powders of this type are suitable for a variety of uses, for example, for the production of sintered glass ceramics. They are particularly useful in dental technology for the production of filled synthetic resins; for this application, the surface of the glass powder particles is very often treated in a manner known per se with suitable silanes, for example, chlorosilanes, in order to obtain better mechanical and chemical binding of the glass powder in the resin composition. Synthetic resins in dental technology are preferably filled with glass powders having mean particle sizes of from 0.5 to 3 $\mu$m, in particular from 0.5 to 1.5 $\mu$m. Although the process also allows mean particle sizes of less than 0.2 $\mu$m to be produced, the advantages of such a lower particle size range are relatively minor, whereas the grinding operation becomes very lengthy and, in general, is no longer economically worthwhile.

This invention is applicable to the production of all types of glass powder, irrespective of the composition thereof. Such compositions are known in the literature, for example, the powders used in dental compositions. See, also, for example, the numerous types of glass that are manufactured in powder form in Schott's Product Information Brochure No. 40001d for technical glass. Accordingly, this invention does not depend on any particular glass composition.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following example, all temperatures are set forth uncorrected in degrees celsius; and, unless otherwise indicated, all parts and percentages are by weight.

The entire disclosure of all applications, patents and publications, cited above, and of corresponding German Application P 41 00 604.6, are hereby incorporated by reference.

EXAMPLE 20 kg of a glass powder of a particle size less than 200 $\mu$m and an average particle size of about 40 $\mu$m and 30 l suspension liquid, consisting of a 95 wt% water and 5 wt% 1-propanol were introduced into a stirred vessel and pumped continuously through a stirred ball mill having a capacity of 12.5 l, which was previously filled with 18 kg glass particles of a cylindrical shape with a diameter of 1.3 mm and a length of 1.3 mm as a grinding medium. The grinding medium is prevented from leaving the stirred ball mill by a gap of 0.3 mm, which is part of the stirred ball mill. The impeller stirs the media at a velocity of 1400 rpm. The impeller and the interior of the vessel and the mill have a resilient coating of a polyurethane resin. After an operating time of 8 hours, the slurry is freeze-dried at $-40°$ C. The resulting powder has an average particle size of about 0.7 $\mu$m, with all particles less than 3 $\mu$m.

For a special purpose, this glass is heated in an oxidizing atmosphere (air) for 48 hours at a temperature of 500° C. to yield an extremely pure and bright powder. The mill that was used is a Drais Ruhrwerksmuhle Type PM 12.5 RLV.

The chemical composition of the glass powder is (in weight-% on oxide basis): $SiO_2$ 55; $BaO$ 25; $B_2O_3$ 10; $Al_2O_3$ 10.

The preceding example can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the preparation of very fine glass powder of high purity having a desired mean particle size $d_{50}$ of $\leq 10$ $\mu$m by wet-grinding in the presence of grinding elements, comprising grinding a glass powder having a higher mean particle size than 10 $\mu$m and a maximum particle size of $\leq 300$ $\mu$m to said desired mean particle size $d_{50}$ of $\leq 10$ $\mu$m in a stirred mill with glass grinding elements, in the presence of a grinding liquid comprising water or a mixture of at least 50% by weight of water and at least one water-soluble, oxygen-containing organic compound having 1 to 5 carbon atoms in the molecule; freezing the ground slurry; and freeze-drying the frozen ground slurry to remove the grinding liquid.

2. A process according to claim 1, wherein the grinding elements have the same composition as the glass to be ground.

3. A process according to claim 1, wherein the grinding elements have a size of from 0.3 to 10 mm.

4. A process according to claim 1, wherein the grinding elements have a size of from 0.5 to 2 mm.

5. A process according to claim 1, wherein the grinding elements are cylindrical.

6. A process according to claim 1, wherein the grinding liquid has a pH of from 1 to 12.

7. A process according to claim 6, wherein the grinding liquid has a pH of from 2 to 6.

8. A process according to claim 6, wherein the grinding liquid has a pH of from 8 to 12.

9. A process according to claim 6, comprising adjusting the pH with a compound selected from the group consisting of hydrochloric acid, nitric acid, ammonia and ethylamine.

10. A process according to claim 1, wherein the grinding liquid is a mixture of 80–99% by weight water and 1–20% by weight of a compound selected from the group consisting of methanol, ethanol, n-propanol or i-propanol, acetone and tert.-butyl alcohol.

11. A process according to claim 1, wherein the mill comprises or is coated with (i) an abrasion-resistance plastic, or (ii) with a glass having substantially the same properties as the glass to be ground, on at least parts of the mill contacting the powder.

12. A process according to claim 11, wherein said abrasion-resistant plastic is reinforced with a filler selected from the group consisting of glass powder and glass fibers, the reinforcing glass having substantially the same properties as the glass to be ground.

13. A process according to claim 1, further comprising, after the freeze-drying, heating resultant glass powder for from 1 hour to 10 days in an oxidizing atmosphere at a temperature of from 250° C. to the glass transition temperature $T_g$.

14. A process according to claim 13, wherein the glass powder is heated for from 12 to 48 hours at a temperature below the glass transition temperature $T_g$ of from 400 to 600° C. in air.

15. A process according to claim 2, wherein the grinding elements have a size of from 0.5 to 2 mm.

16. A process according to claim 4, wherein the grinding liquid has a pH of from 8 to 12.

17. A process according to claim 15, wherein the grinding liquid is a mixture of 80–99% by weight water and 1–20% by weight methanol, ethanol, n- or i-propanol, acetone or tert.-butyl alcohol.

18. A process according to claim 16, wherein the grinding liquid is a mixture of 80–99% by weight water and 1–20% by weight methanol, ethanol, n- or i-propanol, acetone or tert.-butyl alcohol.

19. A process according to claim 18, further comprising heating the glass powder for from 12 to 48 hours at a temperature of from 400 to 600° C. in air.

20. In a process for the preparation of glass powder by wet grinding a mixture of particulate glass and a grinding liquid, the improvement which comprises freeze-drying resultant slurry to remove the grinding liquid.

21. A process according to claim 1, further comprising heating resultant glass powder at a sufficiently high temperature and for a sufficiently long time in an oxidizing atmosphere to remove any gray color and lighten the glass.

22. A process according to claim 20, further comprising heating resultant glass powder at a sufficiently high temperature and for a sufficiently long time in an oxidizing atmosphere to remove any gray color and lighten the glass.

23. A process for the preparation of very fine glass powder of high purity having a desired mean particle size $d_{50}$ of $\leq 10$ μm by wet-grinding in the presence of grinding elements, comprising grinding a glass powder having a higher mean particle size than 10 μm and a maximum particle size of $\leq 300$ μm to said desired particle size in a stirred mill with glass grinding elements, in the presence of a grinding liquid comprising a mixture of at least 50% by weight of water and at least one water-soluble, oxygen-containing organic compound having 1 to 5 carbon atoms in the molecule; freezing the ground slurry; and freeze-drying the frozen ground slurry to remove the grinding liquid.

24. A process for the preparation of very fine glass powder of high purity having a desired means particle size ($d_{50}$) of $\leq 10$ μm by wet grinding in the presence of grinding elements, comprising:
(a) grinding a glass powder having a means particle size greater than 10 μm and a maximum particle size $\leq 300$ μm to said desired means particle size ($d_{50}$) of $\leq 10$ μm in a stirred mill with glass grinding elements, in the presence of a grinding liquid comprising water or a mixture of at least 50% by weight of water and at least one water soluble oxygen-containing organic compound having 1 to 5 carbon atoms in the molecule;
(b) freezing the ground slurry;
(c) freeze-drying the frozen ground slurry to remove the grinding liquid; and
(d) heating the resultant glass powder at a sufficiently high temperature and for a sufficiently long time in an oxidizing atmosphere to remove any gray color and lighten the glass.

25. In a process for the preparation of a glass powder by wet grinding a mixture of particulate glass and a grinding liquid, the improvement which comprise:
(a) freeze-drying the resultant slurry to remove the grinding liquid; and
(b) heating the resultant glass powder at a sufficiently high temperature and for a sufficiently long time in an oxidizing atmosphere to remove any gray color and lighten the glass.

* * * * *